United States Patent [19]

Konii et al.

[11] 4,362,203

[45] Dec. 7, 1982

[54] PROCESS FOR PREPARING FOUNDRY CORES OR MOLDS AND BINDER MATERIALS USED THEREFOR

[75] Inventors: Susumu Konii; Shigeo Sase; Masatoshi Yoshida; Shoei Kuroda; Takeshi Sumi, all of Shimodate, Japan

[73] Assignee: Hitachi Chemical Co., Ltd., Tokyo, Japan

[21] Appl. No.: 248,536

[22] Filed: Mar. 27, 1981

Related U.S. Application Data

[62] Division of Ser. No. 92,022, Nov. 7, 1979, Pat. No. 4,283,319.

[30] Foreign Application Priority Data

Nov. 13, 1978 [JP]  Japan ................................ 53-139733

[51] Int. Cl.$^3$ ............................ B22C 1/18; B22C 1/22
[52] U.S. Cl. ..................................... 164/16; 164/527; 164/525
[58] Field of Search ................... 164/12, 16, 526–529; 523/145, 143, 142; 528/483

[56] References Cited

U.S. PATENT DOCUMENTS

| | | | |
|---|---|---|---|
| 2,706,163 | 4/1955 | Fitke | 524/442 |
| 2,888,413 | 5/1959 | Pace | 521/129 |
| 4,051,092 | 9/1977 | Houk et al. | 523/142 |
| 4,179,427 | 12/1979 | Gardikes | 523/143 |

FOREIGN PATENT DOCUMENTS

50-37012  4/1975  Japan .
54-27168  3/1979  Japan .

*Primary Examiner*—Gus T. Hampilos
*Assistant Examiner*—K. Y. Lin
*Attorney, Agent, or Firm*—Antonelli, Terry & Wands

[57] ABSTRACT

A novel process for preparing foundry cores or molds and binder materials used therefor are provided. The binder materials comprise (a) an alcohol-soluble phenolic resin, (b) a polyvalent metal hydroxide and/or oxide, (c) water, (d) an organic solvent, and (e) an alkali metal hydroxide. They are admixed with refractory particles, such as sand, and cured with carbon dioxide to form shaped foundry cores or molds. The process and materials of the invention bring about such advantages that curing may be performed with safe carbon dioxide, that shaped foundry cores or molds may be taken out from pattern immediately after curing, and that the products have a superior collapsibility after pouring a molten metal.

18 Claims, No Drawings

PROCESS FOR PREPARING FOUNDRY CORES OR MOLDS AND BINDER MATERIALS USED THEREFOR

This is a division of application Ser. No. 92,022 filed Nov. 7, 1979, now U.S. Pat. No. 4,283,319.

The invention relates to a novel process for preparing foundry cores or molds and to binder materials used for the process.

Known processes for preparing foundry cores or molds may be classified into two groups; the one using an inorganic compound as a major binder material, and another using an organic compound as a major binder material. Of the former processes, the process using chiefly sodium silicate and curing it with carbon dioxide has been widely performed.

Although the process has such advantages that no heating is needed and that shaped or molded foundry cores or molds may be taken out from pattern immediately after blowing carbon dioxide, it has also such disadvantages that the cores or molds lack combustibility because the binder material is of inorganic substance, and therefore, has a poor collapsibility after pouring molten metal.

As known foundry cores or molds in which organic substances are used for binder materials, there are shell mold process foundry cores or molds wherein foundry mold composition containing a phenol resin is heated to make a mold (U.S. Pat. Nos. 2,706,163 and 2,888,413) and self-curing foundry cores or molds wherein a furan resin is used for the major binder material and cured with an acid (Japanese Patent Publication No. 50-37012/1975). Although they have such an advantage that they have a superior collapsibility, they also have such disadvantages that heating is needed, or that it takes a long period of time before foundry cores or molds are cured in case when the curing is performed at room temperature.

Recently, a binder material for foundry cores or molds, wherein a phenol resin and an isocyanate are used for the major binder materials and the instantaneous curing and taking out of shaped foundry cores or molds are performed at room temperature by blowing an amine gas, has been developed (U.S. Pat. No. 3,409,579). Here again, there are problems of toxicity and odor of amine gas to be used.

In order to improve the collapsibility of molds in the sodium silicate carbon dioxide process, there has also been proposed that a binder material, wherein dextrin, wood flour, synthetic resins or the like are added to sand together with sodium silicate, is employed (Japanese Patent Publication No. 54-27168/1979). The additives, however, prevent polymerization of the sodium silicate and lower the binding property and are not sufficient for making the improvement of collapsibility after pouring a molten metal and the maintenance of mold strength compatible.

There is also the "lime foundry process" wherein a water-soluble phenol resin is cured by blowing carbon dioxide.

The process is to utilize the heat generated by the exothermic reaction of carbon dioxide and calcium hydroxide in order to cure the phenol resin, thus binding sand. However, the released heat is not sufficient to attain the thermosetting quickly, in addition to the fact that absorption of heat accompanies as a result of rapid expansion of carbon dioxide when it is introduced into a pattern from a bomb, and thus it takes a long time to cure the foundry sand admixture.

The invention is to remove the above-mentioned defects and provide a foundry process that gives a superior collapsibility after pouring a molten metal. In this invention, an organic substance is used for the major binder material, and shaped foundry cores or molds may be taken out at room temperature immediately after blowing carbon dioxide that is safe in handling.

In this invention, the foundry mold composition comprises (A) refractory particles, (B) an alcohol-soluble phenolic resin, (C) a polyvalent metal hydroxide and/or oxide, (D) water, (E) an alkali metal hydroxide, and (F) an organic solvent.

The composition is shaped in a pattern and gassed with carbon dioxide.

According to the invention, the following advantages may be obtained:

Gassing may be performed by blowing carbon dioxide that is safe in handling.

Shaped foundry cores or molds may immediately be taken out from pattern at room temperature.

Shaped foundry cores or molds obtained have a superior collapsibility after pouring a molten metal.

The binder material according to the invention comprises (a) an alcohol-soluble phenolic resin, (b) a polyvalent metal hydroxide and/or oxide, (c) water, (d) an organic solvent, and (e) an alkali metal hydroxide.

When carbon dioxide is blown into the binder material, the alcohol-soluble phenolic resin separates out as the polyvalent metal salt or as a resin having free phenolic hydroxyl groups, thus solidifying the foundry and admixture. p The alcohol-soluble phenolic resin according to this invention is referred to as a phenolic resin which causes turbidity visible to the naked eye when it is mixed with water amounting by weight to ten times as much as that of the resin and the mixture is stirred sufficiently at 25° C., i.e., the water-tolerance of the resin at 25° C. being not more than 10 by weight.

The phenolic resin which shows as a whole the properties mentioned above may be included in the phenolic resin according to this invention, even when it contains partially a water-soluble component therein.

As the alcohol-soluble phenolic resin used in the invention, there may be mentioned not only so-called alcohol-soluble phenol/formaldehyde resins but also resins that have phenolic hydroxyl groups which form salts with polyvalent metals in the high molecular structure, such as phenol-modified xylene resins, phenol-modified toluene resins, cashew resins and DFK (shale oil) resins.

Phenol/formaldehyde resins, for instance, may be classified into water-soluble ones and into alcohol soluble ones.

Water-soluble phenol/formaldehyde resins may be produced by condensing phenol with formaldehyde in the presence of an alkali catalyst, then by stopping the reaction, by cooling, before the condensate loses the water-solubility.

The condensate is a low molecular weight resin having a number-average molecular weight of approximately 200 and comprising chiefly not more than three phenol nuclei.

In contrast thereto, alcohol-soluble phenol/formaldehyde resins are of high molecular weight. As water-soluble phenol resins have low molecular weight and low viscosity, they will make molds having insufficient strength, immediately after putting into pattern and blowing carbon dioxide, also after allowing them to stand.

It is, therefore, preferable to use a high molecular weight phenolic resin having a number-average molecular weight of preferably not less than 400, more preferably not less than 500, most preferably not less than 800, so that the polyvalent metal salt is insoluble in water and brings about a sufficient binding property.

The alcohol-soluble phenolic resins used in the invention include, irrespective of the form of linkage, resols, novolaks, N-methyleneresols, dimethylene ether-type resols and formal-type resols. Phenols which are synthetic materials for the resins include not only phenol but also cresol, butylphenol, bisphenol, nonylphenol, catechol, resorcinol and the like.

Also aldehydes include lower aldehydes such as formaldehyde, paraform, hexamine and acetaldehyde to prepare the phenolic resins.

Use of novolak-type phenolic resins gives high strength of molds immediately after gassing carbon dioxide, while use of resol-type phenolic resins gives high strength of molds after allowing them to stand at room temperature.

It is, therefore, possible to use novolak-type and resol-type resins in combination.

The polyvalent metal hydroxide and/or oxide include hydroxides and oxides of calcium, magnesium, barium, aluminum, zinc, iron, nickel, titanium, silicon, tin or the like. Thereof, hydroxides and/or oxides of alkaline earth metals, especially of calcium, barium and magnesium are preferable in view of the reactivity with phenolic resins and of affinity with water. Hydroxides and oxides of other metals other than calcium may effectively be used in combination with calcium hydroxide or oxide.

They may be employed in an amount of 10–300 parts by weight, preferably 10–150 parts by weight, more preferably 30–100 parts by weight based on 100 parts by weight of the alcohol-soluble phenolic resin. Their use in excess amount will promote the curing rate with carbon dioxide, but at the same time give a bad influence on the collapsibility due to sintering of a polyvalent metal compound.

To the contrary, their use in too small amount will retard the curing rate with carbon dioxide.

In this invention, water is essential to give the binding property by the formation of polyvalent metal carbonates and phenolic salts of polyvalent metal when carbon dioxide is blown, after ionization of polyvalent metal hydroxide and/or oxide and initiation of the reaction between hydroxyl groups and polyvalent metal hydroxide and/or oxide. Accordingly, the amount of water may vary, depending on the hydrophilicity of the alcohol-soluble phenolic resin and of the polyvalent metal. In general, its use in excess amount will cause the lack of binding property, while its use in too small amount will cause a difficulty in completing the reaction. Water is, therefore, used in an amount of preferably 100–500 parts by weight, more preferably 150–500 parts by weight, most preferably 150–300 parts by weight, based on 100 parts by weight of alcohol-soluble phenolic resin.

In this invention, the binding property can further be improved by using an organic solvent, since it reduces the viscosity of binder materials by dissolving the alcohol-soluble phenolic resin so that the wettability of the binder materials to refractory particles is improved.

As organic solvents, there may be employed alcohols; aromatic hydrocarbons; ketones such as acetone and methyl ethyl ketone; acetic esters; phthalic esters; ethers such as dioxane; cellosolves; dimethylformamide; dimethyl sulfoxide; or the like. Among these, alcohols are most preferred. Here, there may preferably be employed such lower alcohols as methanol, ethanol, propanol, isopropanol and tert-butanol; and such polyhydric alcohols as ethylene glycol, diethylene glycol, triethylene glycol, propylene glycol, dipropylene glycol, tripropylene glycol, trimethylol propane, trimethylol ethane, glycerin, sorbitol, mannitol and dulcitol.

The lower alcohols promote insolbilization and separation of the polyvalent metal salt of the phenolic resin formed by blowing carbon dioxide, and strengthen the binding property.

The polyhydric alcohols increase the solubility of polyvalent metal hydroxide and/or oxide, thus promoting the formation of the polyvalent metal salt of the phenolic resin; they also increase the strength of shaped or molded cores or mold immediately after blowing carbon dioxide.

The organic solvents may be used alone or jointly; but the joint use of a lower alcohol and a polyhydric alcohol is more effective. They may be used in an amount of preferably 1–100 parts by weight, based on 100 parts by weight of the alcohol-soluble phenolic resin.

In this invention, alkali metals are considered to form a hydrophilic salt with phenolic hydroxyl groups, thus making it easier to form a polyvalent metal salt of the alcohol-soluble phenolic resin.

As alkali metals, there may be employed, for example, sodium hydroxide, potassium hydroxide and lithium hydroxide, particularly sodium hydroxide due to the degree of the hydrophilic property.

The amount of the alkali metal hydroxide will vary from 0.1–50 parts by weight, based on 100 parts by weight of the phenolic resin.

In this invention, methods of mixing binder materials with refractory particles are not critical. They may be performed with a mixer, preferably a quick-blending mixer such as speed mixer, continuous mixer and muller. Foundry mold compositions in which the binder material of the invention is added and mixed with refractory particles may be stored in an airtight receptacle. It is preferable, however, that they are used as soon as possible after mixing.

In this invention, carbon dioxide used for curing need not necessarily be pure. Any gas may be used, as far as it contains carbon dioxide and has the pressure and flow rate necessary for passing through the composition when refractory particles admixed with resins and other materials are put in a pattern. It is blown until the foundry composition is cured and may well be taken out from a pattern like a wooden pattern.

Usually, blowing of gas at pressure of 0.1–3.0 kg/cm$^2$ for 3–120 seconds is enough, depending, however on the scale of mold, easiness of draught through foundry mold composition, and the like.

The binder material of the invention is used for foundry mold compositions, admixed with refractory particles. It is preferable that the binder material is mixed with and coated on refractory particles uniformly.

The amount of binder material will vary 0.5–20 parts by weight, preferably 1–10 parts by weight, based on 100 parts by weight of refractory particles.

While the refractory particles to be used in this invention may be any ones which can usually be used to prepare foundry cores or molds, there may preferably be employed silica sands, zircon sands, olivine sands, chromite sands and the like.

Further, such additives as coal dust and graphite powder may be added to the composition.

Methods of adding the binder material to refractory particles are not critical. For example, a part of each component of binder material may be made a mixed powder. Alternatively, the components are independently dissolved in water or an organic solvent to make solutions, emulsions or suspensions which, in turn, are mixed to make the binder material. It is preferable that a mixed solution of an alcohol-soluble phenolic resin dissolved in an aqueous solution of alkali metal and an organic solvent previously prepared is mixed with refractory particles and with polyvalent metal hydroxide and/or oxide to form the foundry mold composition. By doing this, the phenolic resin may thoroughly be converted into a hydrophilic salt of the alkali metal in the aqueous solution; thus the polyvalent metal salt of the phenolic resin may readily be formed by blowing carbon dioxide.

The invention is further explained by the following working examples in which parts are all in weight.

EXAMPLE 1-9

Each component of binder material comprising an alcohol-soluble phenolic resin, a polyvalent metal hydroxide or oxide, water, an alkali metal hydroxide and an organic solvent as shown in Table 1 was added to silica sand and mixed, until the binder material was uniformly distributed on the sand particles, giving the sand mixed with the binder material.

The addition of each component was performed by any of the following four methods, so that the amount of the alcohol-soluble phenolic resin was 1.5 parts based on 100 parts of silica sand.

Method (A)

A solution of resin dissolved in an organic solvent and an aqueous solution of alkali metal hydroxide were added to silica sand and mixed for 1 minute. Then a polyvalent metal hydroxide or oxide was added and mixed for 1 minute, giving the sand mixed with the binder material.

Method (B)

An aqueous solution of alkali metal hydroxide salt of a resin, and an organic solvent were added to silica sand and mixed for 1 minute. Then, a polyvalent metal hydroxide or oxide was added and mixed for 1 minute, giving the sand mixed with the binder material.

Method (C)

A mixture of a resin and a mixed solution comprising an aqueous solution of alkali metal hydroxide and an organic solvent was added to silica sand and mixed for 1 minute. Then, a polyvalent metal hydroxide or oxide was added and mixed for 1 minute, giving the sand mixed with the binder material.

Method (D)

A suspension containing a resin, an aqueous solution of alkali metal hydroxide, an organic solvent and a polyvalent metal hydroxide or oxide was added to silica sand and mixed for 2 minutes, giving the sand mixed with the binder material.

Each of 165 g. of thus obtained sand mixed with the binder materials was tamped in a 50$\phi$ wooden pattern with a rammer, forming a 50$\phi \times$50 test piece. Carbon dioxide was blown into the test piece at a pressure of 2.0 kg/cm$^2$ and a flow rate of 25 l/min. for 10 seconds. The test piece was taken out from the pattern giving a piece for the compressive strength test.

The compressive strength immediately after taking out of test pieces from the pattern, as well as that after allowing the test pieces stand at 20° C., 60 RH% for 24 hours was measured by using the test pieces.

Characteristics values of each test piece are indicated in Table 2.

Alcohol-soluble phenolic resins used were prepared as follows:

Resin A.

In a four-necked flask equipped with a condenser and a stirrer were placed 940 g. of phenol, 280 g. of 80% paraformaldehyde and 28 g. of oxalic acid. The mixture was heated at the refluxing temperature (100°–105° C.) for 3 hours, by a conventional method, and condensed by removing the water to give a novolak-type phenol resin A, softening at 87° C. and having a number-average molecular weight of 870. The thus obtained resin A was insoluble in water.

Resin B.

In a four-necked flask equipped with a condenser and a stirrer were placed 940 g. of phenol, 1,200 g. of 37% aqueous solution of formaldehyde and 70 g. of hexamethylenetetramine.

The mixture was heated at 90° C. for 1 hour and condensed by removing the water to give a resol-type phenolic resin B having a viscosity of 100 P (Poise) at 30° C. and having a number-average molecular weight of 650.

The water-tolerance of the thus obtained resin B was not more than 10, i.e., when 10 times by weight of water was added to the resin B, turbidity was caused.

Solution of Resin C.

In a four-necked flask equipped with a condenser and a stirrer were placed 282 g. of phenol and 400 g. of 30% aqueous solution of sodium hydroxide and mixed thoroughly. To the mixture was added, at 60° C., 365 g. of 37% aqueous solution of formaldehyde in several portions. The resulting mixture was heated at 90° C. for 4 hours to give a solution of resol-type phenolic resin C having a viscosity of 40 P at 30° C.

As the resin C is a solution of a phenolic resin dissolved in the aqueous solution of the alkali metal hydroxide, it is not necessary to add an additional alkali metal hydroxide and water when preparing a foundry mold composition. Water-tolerance of the resin C itself was measured after precipitation by neutralization of the alkaline solution with hydrochloric acid. The resin C thus precipitated showed a water-tolerance of not more than 5 and a number-average molecular weight of 900.

Resin D.

In a four-necked flask equipped with a condenser and a stirrer were placed 460 g. of p-tert-butylphenol, 138 g. of 80% paraformaldehyde and 11.5 g. of 20% aqueous solution of sodium hydroxide. The mixture was heated at 90° C. for 2 hours and condensed by removing the water to give a resin D of 120 P at 30° C. and having a number-average molecular weight of 780. The water-tolerance of the resin D was found to be not more than 10.

Resin E.

In a four-necked flask equipped with a condenser and a stirrer were placed 600 g. of phenol, 800 g. of "Nikanol L" (a xylene-formaldehyde resin, available from Mitsubishi Gas Chem. Co.) and 0.6 g. of 20% sulfuric acid. The mixture was heated at 150° C. for 5 hours and condensed by removing the water to give a phenol-modified novolak-type alkylbenzene resin E softening at 95° C. and having a number-average molecular weight of 1,050. The resin E thus obtained was insoluble in water.

The following were also prepared for control:
(1) a binder material containing no polyvalent metal hydroxide or oxide;
(2) a binder material containing no organic solvent; and
(3) a binder material containing a water-soluble phenol/formaldehyde resin (Resin F).

The resin F was prepared as follows:

In a four-necked flask equipped with a condenser and a stirrer were placed 376 g. of phenol, 650 g. of 37% aqueous solution of formaldehyde and 40 g. of 30% aqueous solution of trimethylamine. The mixture was heated at 90° C. for 2 hours to give the water-soluble phenol/formaldehyde resin F that is infinitely dilutable into water and having a number-average molecular weight of 220.

TABLE 1

| | Resin | | Polyvalent metal | | Water | Alkali metal | | Organic solvent | | Method of |
|---|---|---|---|---|---|---|---|---|---|---|
| | Species | Part | Species | Part | Part | Species | Part | Species | Part | addition |
| Example | | | | | | | | | | |
| 1 | A | 100 | Ca(OH)$_2$ | 120 | 200 | NaOH | 20 | ethanol | 30 | B |
| | | | | | | | | sorbitol | 30 | |
| 2 | A | 100 | Ca(OH)$_2$ | 100 | 200 | NaOH | 10 | methanol | 50 | A |
| 3 | B | 100 | Ca(OH)$_2$ | 100 | 150 | KOH | 20 | methanol | 60 | D |
| 4 | B | 100 | Ca(OH)$_2$ | 100 | 150 | KOH | 30 | glycerin | 60 | B |
| | | | Ba(OH)$_2$ | 30 | | | | | | |
| 5 | A | 50 | Ca(OH)$_2$ | 100 | 200 | NaOH | 20 | isopropanol | 60 | C |
| | B | 50 | | | | | | | | |
| 6 | C | 340 | Ca(OH)$_2$ | 100 | contained in resin | | | methanol | 40 | C |
| | | | | | (180– | (NaOH 35–40) | | glycerin | 40 | |
| | | | | | 200) | | | | | |
| 7 | C | 340 | CaO | 150 | contained in resin | | | ethylene | 60 | C |
| | | | | | (180– | (NaOH 35–40) | | glycol | | |
| | | | | | 200) | | | | | |
| 8 | D | 100 | CaO | 100 | 250 | KOH | 30 | methyl | 60 | D |
| | | | Fe$_2$O$_3$ | 40 | | | | cellosolve | | |
| 9 | E | 100 | Ca(OH)$_2$ | 80 | 150 | NaOH | 20 | acetone | 80 | A |
| | | | Al(OH)$_3$ | 40 | | | | | | |
| Control | | | | | | | | | | |
| 1 | A | 100 | — | — | 200 | NaOH | 20 | ethanol | 30 | C |
| | | | | | | | | sorbitol | 30 | |
| 2 | B | 100 | Ca(OH)$_2$ | 100 | 150 | KOH | 20 | — | — | B |
| 3 | F | 100 | Ca(OH)$_2$ | 150 | 150 | NaOH | 30 | methanol | 60 | B |

Note:
"Part" in Table means part by weight.

TABLE 2

| | Compressive strength (Kg/cm$^2$) immediately after taking out from pattern | Compressive strength (Kg/cm$^2$) after allowing to stand for 24 hours | Collapsibility after pouring |
|---|---|---|---|
| Example | | | |
| 1 | 7.4 | 26.2 | natural collapsing |
| 2 | 6.8 | 27.8 | natural collapsing |
| 3 | 6.6 | 30.2 | natural collapsing |
| 4 | 6.3 | 31.4 | natural collapsing |
| 5 | 7.5 | 29.8 | natural collapsing |
| 6 | 8.4 | 32.6 | natural collapsing |
| 7 | 7.9 | 27.2 | natural collapsing |
| 8 | 6.5 | 24.2 | natural collapsing |
| 9 | 7.2 | 28.6 | natural collapsing |
| Control | | | |
| 1 | no curing | — | — |
| 2 | 2.5 | 14.3 | natural collapsing |
| 3 | 0.6 | 8.8 | natural collapsing |

From the foregoing description, it will be apparent that foundry cores or molds having good collapsibility may be prepared at room temperature for a short period of time, without using any toxic gas, in accordance with use of the binder materials and the foundry process of the invention.

We claim:

1. A process for preparing a foundry core or mold which comprises forming into a shape of a core or mold a foundry mold composition containing (A) refractory particles, and (B) a foundry binder material comprising an alcohol-soluble phenolic resin selected from the group consisting of a resole, a novolac, an N-methylene-resole, a dimethylene ether-type resole, a formal-type resole and a mixture thereof, 10 to 300 parts by weight of a hydroxide and/or an oxide of a polyvalent metal selected from the group consisting of an alkaline earth metal, aluminum, zinc, iron, nickel, titanium, silicon, tin, and a mixture thereof, 100–500 parts by weight of water, 1 to 100 parts by weight of an organic solvent selected from the group consisting of an alcohol, an aromatic hydrocarbon, a ketone, an acetic ester, a phthalic ester, an ether, a cellosolve, dimethylformamide dimethyl sulfoxide and a mixture thereof, and 0.1 to 50 parts by weight of an alkali metal hydroxide, said parts by weight being based on 100 parts by weight of said alcohol-soluble phenolic resin, and then gassing said core or mold with carbon dioxide.

2. The process according to claim 1, wherein the foundry mold composition is prepared by mixing a mixed solution of the alcohol-soluble phenolic resin dissolved in the aqueous alkali metal hydroxide solution and the organic solvent, with the polyvalent metal hydroxide and/or oxide and the refractory particles.

3. The process according to claim 1, wherein the alcohol-soluble phenolic resin has a number-average molecular weight of not less than 400.

4. The process according to claim 3, wherein the alcohol-soluble phenolic resin has a number-average molecular weight of not less than 500.

5. The process according to claim 4, wherein the alcohol-soluble phenolic resin has a number-average molecular weight of not less than 800.

6. The process according to claim 1, wherein the alcohol-soluble phenolic resin is a novolak-type phenolic resin.

7. The process according to claim 1, wherein the alcohol-soluble phenolic resin is an alcohol-soluble resol-type phenolic resin.

8. The process according to claim 6, wherein the alcohol-soluble resol-type phenolic resin is a resol-type phenol/formaldehyde resin.

9. The process according to claim 1, wherein the alcohol-soluble phenolic resin is a mixture of a novolak-type phenolic resin and a resol-type phenolic resin.

10. The process according to claim 1, wherein the polyvalent metal hydroxide and/or oxide are alkaline earth metal hydroxide and/or oxide.

11. The process according to claim 11, wherein the alkaline earth metal hydroxide and/or oxide are calcium hydroxide and/or oxide.

12. The process according to claim 1, wherein the organic solvent is an alcohol.

13. The process according to claim 12, wherein the alcohol is a lower alcohol.

14. The process according to claim 13, wherein the lower alcohol is methanol.

15. The process according to claim 12, wherein the alcohol is a polyhydric alcohol.

16. The process according to claim 15, wherein the polyhydric alcohol is glycerin or ethylene glycol.

17. The process according to claim 12, wherein the alcohol is a mixture of a lower alcohol and a polyhydric alcohol.

18. The process according to claim 1, wherein the alkali metal hydroxide is sodium hydroxide.

* * * * *